US007200392B2

(12) United States Patent
Kennedy, Jr. et al.

(10) Patent No.: US 7,200,392 B2
(45) Date of Patent: Apr. 3, 2007

(54) WIRELESS COMMUNICATION NETWORK MEASUREMENT DATA COLLECTION USING INFRASTRUCTURE OVERLAY-BASED HANDSET LOCATION SYSTEMS

(75) Inventors: Joseph P. Kennedy, Jr., Great Falls, VA (US); Thomas B. Gravely, Herndon, VA (US); Andrew Beck, Ashburn, VA (US); John P. Carlson, Herndon, VA (US)

(73) Assignee: Andrew Corporation, Ashburn, VA (US)

( * ) Notice: Subject to any disclaimer, the term of this patent is extended or adjusted under 35 U.S.C. 154(b) by 0 days.

(21) Appl. No.: 10/531,042

(22) PCT Filed: Oct. 16, 2003

(86) PCT No.: PCT/US03/32583

§ 371 (c)(1),
(2), (4) Date: Oct. 19, 2005

(87) PCT Pub. No.: WO2004/036361

PCT Pub. Date: Apr. 29, 2004

(65) Prior Publication Data

US 2006/0141998 A1   Jun. 29, 2006

Related U.S. Application Data

(60) Provisional application No. 60/418,342, filed on Oct. 16, 2002.

(51) Int. Cl.
*H04Q 7/20* (2006.01)
(52) U.S. Cl. ............... 455/423; 455/456.2; 455/404.2; 455/456.5; 455/434; 342/357.09; 340/539.11

(58) Field of Classification Search .. 455/456.1–456.6, 455/457, 404.2, 433, 436–437, 67.13; 342/357.1, 342/357.01, 357.09; 701/201, 207, 213; 340/539.11, 539, 825.36
See application file for complete search history.

(56) References Cited

U.S. PATENT DOCUMENTS

| 4,783,744 | A |   | 11/1988 | Yueh |
|---|---|---|---|---|
| 5,317,323 | A |   | 5/1994 | Kennedy, Jr. et al. |
| 5,465,289 | A |   | 11/1995 | Kennedy, Jr. et al. |
| 5,506,863 | A |   | 4/1996 | Meidan et al. |
| 5,870,029 | A |   | 2/1999 | Otto et al. |
| 5,960,355 | A | * | 9/1999 | Ekman et al. ........... 455/456.1 |

(Continued)

OTHER PUBLICATIONS

Leshem, et al., "Array Calibration in the Presence of Multipath," IEEE Transactions of Signal Processing, vol. 48, No. 1, pp. 53-59, Jan. 1, 2000.

(Continued)

*Primary Examiner*—Jean Gelin
*Assistant Examiner*—Kamran Afshar
(74) *Attorney, Agent, or Firm*—Duane Morris LLP (57) ABSTRACT

A method and system for collecting test and measurement data for a wireless communication system utilizes a network overlay geo-location system to collect the data. The wireless communication system has plural base stations defining a signal coverage area for communication with a mobile appliance and collects test and measurement data simultaneous on the forward and reverse links during standard geo-location processes. The wireless communication system also collects test and measurement data when the network overlay geolocation system is in an idle state.

39 Claims, 4 Drawing Sheets

U.S. PATENT DOCUMENTS

| | | | |
|---|---|---|---|
| 6,144,711 | A | 11/2000 | Raleigh et al. |
| 6,188,351 | B1 | 2/2001 | Bloebaum |
| 6,198,935 | B1* | 3/2001 | Saha et al. ............... 455/456.2 |
| 6,212,391 | B1 | 4/2001 | Saleh et al. |
| 6,295,455 | B1* | 9/2001 | Fischer et al. ........... 455/456.2 |
| 6,311,043 | B1 | 10/2001 | Haardt et al. |
| 6,334,059 | B1 | 12/2001 | Stilp et al. |
| 6,470,195 | B1 | 10/2002 | Meyer |
| 6,477,161 | B1 | 11/2002 | Hudson et al. |
| 6,501,955 | B1 | 12/2002 | Durrant et al. |
| 6,553,322 | B1 | 4/2003 | Ignagni |
| 6,782,264 | B2 | 8/2004 | Anderson et al. |
| 6,834,234 | B2 | 12/2004 | Scherzinger et al. |
| 6,839,539 | B2 | 1/2005 | Durrant et al. |
| 6,845,240 | B2 | 1/2005 | Carlson et al. |
| 6,920,329 | B2* | 7/2005 | Kennedy et al. ......... 455/456.1 |
| 6,922,170 | B2 | 7/2005 | Alexander, Jr. |
| 6,952,158 | B2* | 10/2005 | Kennedy, Jr. ............ 455/456.1 |
| 2002/0094821 | A1 | 7/2002 | Kennedy, Jr. |
| 2002/0111158 | A1* | 8/2002 | Tee ............................ 455/436 |
| 2002/0151325 | A1* | 10/2002 | Fitton et al. ................ 455/553 |
| 2002/0175855 | A1* | 11/2002 | Richton et al. ........ 342/357.02 |
| 2003/0054813 | A1* | 3/2003 | Riley et al. ................. 455/446 |
| 2003/0190919 | A1 | 10/2003 | Niemenmaa |
| 2004/0043775 | A1 | 3/2004 | Kennedy, Jr. et al. |
| 2004/0067759 | A1* | 4/2004 | Spirito et al. ............ 455/456.1 |
| 2004/0198279 | A1* | 10/2004 | Anttila et al. ............ 455/456.1 |
| 2004/0220728 | A1* | 11/2004 | Cayford ...................... 701/209 |
| 2004/0266457 | A1* | 12/2004 | Dupray .................... 455/456.5 |
| 2005/0136945 | A1* | 6/2005 | Kennedy et al. ......... 455/456.1 |
| 2005/0164712 | A1* | 7/2005 | Kennedy et al. ......... 455/456.1 |

OTHER PUBLICATIONS

Ziskind, I., Wax, M., "Maximum likelihood localization of multiple sources by alternating projection", IEEE Trans. Acoust., Speech, Signal Process. vol. 36, No. 2 (Oct. 1988), 1553-1560.

Van Der Veen, M, Papadias, C.B., Paulraj, A.J., "Joint angle and delay estimation" IEEE Communications Letters vol. 1-1 (Jan. 1997), 12-14.

Schmidt, R.O. "Multiple emitter location and signal parameter estimation" Proc. RADC Spectrum Estimation Workshop, (Mar. 1999), 243-258.

Young-Fang Chen, Michael D. Zoltowski "Joint Angle and Delay estimation of DS-CDMA communication systems with Application to Reduced Dimension Space-time 2D Rake Receivers", IEEE Transactions on Signal Processing.

Paulraj, A.J., Papadias, C.B., "Space-Time Signal Processing for Wireless Communications", IEEE Signal Processing Magazine, vol. 11 (Nov. 1997), 49-83.

Paulraj, A.J., Papadias, C.B., "Space-Time Signal Processing for Wireless Communications: A Survey" Information System Laboratory, Standford University.

Haardt, Brunner and Nossek Joint Estimation of 2-D Arrival Angles, Propagation Delays, and Doppler Frequencies in Wireless Communications, Proc. IEEE Digital Signal Processing Workshop, vol. 1, pp. 1-4, Bryce Canyon National Park, Utah, Aug. 1998.

M.Wax, "Position location from sensors with position uncertainty", IEEE Trans. Aero., Elect. Syst. AES-19, No. 2 (Sep. 1983), 658-662.

D.J. Torrieri. "Statistical Theory of Passive Location Systems", IEEE Trans. Aerosp. Electron. Syst. AES-20, No. 2 (Mar. 1984), 183-198.

Y.T. Chan and K.C. Ho, "A simple and efficient estimator for hyperbolic location", IEEE Trans. Signal Proc. 42, No. 8 (Aug. 1994), 1905-1915.

W.H. Foy. "Position location solutions by Taylor series estimation", IEEE trans Aerosp. Electron. System AES-12, No. 2 (Mar. 1976), 187-194.

R.G. Stansfield, "Statistical theory of DF fixing", Journ. IEE 94, part IIIa (Oct. 1947), 762-770.

M.P. Wylie and J. Houtzman, "The non-line of sight problem in mobile location estimation". Proc. IEEE 5thIinternational Conf. on Universal Personal Communications, vol. 2 (Oct. 1996), 827-831.

L. Cong and W.Xuang, "Non-Line-of-Sight Error Mitigation in TDOA mobile location" Proc. IEEE Global Telecommunications conference vol. 1 (2001), 680-684.

P.C. Chen, "A non-line-of-sight error mitigation algorithm in location estimating" Proc. IEEE Conf. on wireless Communications Networking, vol. 1 (1999), 316-320.

N.J. Thomas, D.G.M. Cruickshank and D.I.Laurenson, "Performance of a TDOA-AOA hybrid mobile location system" 3G Mobile Communication Technologies Conf. Proc. 1 (Mar. 2001), 216-220.

Caffery, J., Jr., et al., "Subscriber Location in CDMA Cellular Networks," IEEE Transactions on Vehicular Technology, vol. 47, No. 2, May 1998.

Caffery, J., Jr., "A New Approach to the Geometry of TOA Location," IEEE, VTC 2000, pp. 1943-1949.

\* cited by examiner

PRIOR ART

WIRELESS COMMUNICATION NETWORK MEASUREMENT DATA COLLECTION USING INFRASTRUCTURE OVERLAY-BASED HANDSET LOCATION SYSTEMS

CROSS REFERENCES

The present application is co-pending with and claims priority benefit of U.S. provisional application entitled "Geolocation of Mobile Appliances" Ser. No. 60/418,342 and filed on Oct. 16, 2002, the entirety of which is incorporated herein by reference.

The present application is related to and concurrently filed with applications titled "A NETWORK OVERLAY GEO-LOCATION SYSTEM WITH SMART ANTENNAS AND METHOD OF OPERATION" SN PCT/US03/32578, "A SYSTEM AND METHOD FOR ENHANCING THE ACCURACY OF A LOCATION ESTIMATE" Ser. No. PCT/US03/32574, "NETWORK OVERLAY LOCATION SYSTEM AND METHOD FOR AIR INTERFACE WITH FREQUENCY HOPPING" SN PCT/US03/32579, "A SYSTEM AND METHOD FOR ESTIMATING THE MULTI-PATH DELAYS IN A SIGNAL USING A SPATIALLY BLIND ANTENNA ARRAY" SN PCT/US03/32585, SYSTEM AND METHOD FOR OPERATING A NETWORK OVERLAY GEO-LOCATION SYSTEM WITH REPEATERS" SN PCT/US03/32580, filed Oct. 16, 2003, the entirety of each of these applications.

BACKGROUND

The disclosed subject matter allows test and measurement data to be generated from a geo-location overlay network in a host wireless communication system.

The use of wireless communication devices such as telephones, pagers, personal digital assistants, laptop computers, etc., hereinafter referred to collectively as "mobile appliances" or "mobiles", has become prevalent in today's society. Recently, at the urging of public safety groups, there has been increased interest in technology which can determine the geographic position, or "geo-locate" a mobile appliance in certain circumstances. For example, the Federal Communication Commission (FCC) has issued a geo-location mandate for providers of wireless telephone communication services that puts in place a schedule and an accuracy standard under which the providers of wireless communications must implement geo-location technology for wireless telephones when used to make a 911 emergency telephone call (FCC 94-102 E911).

In addition to E911 emergency related issues, wireless telecommunications providers are developing location-enabled services for their subscribers including roadside assistance, turn-by-turn driving directions, concierge services, location-specific billing rates and location-specific advertising.

To support FCC E911 rules to locate wireless 911 callers, as well as the location enabled services, the providers of wireless communication services are installing mobile appliance location capabilities into their networks. In operation, these network overlay location systems take measurements on RF (Radio Frequency) transmissions from mobile appliances at base station locations surrounding the mobile appliance, and estimate the location of the mobile appliance with respect to the base stations. Because the geographic location of the base stations is known, the determination of the location of the mobile appliance with respect to the base station permits the geographic location of the mobile appliance to be determined. The RF measurements of the transmitted signal at the base stations may include, but are not limited to, the time of arrival, the angle of arrival, the signal power, or the unique/repeatable radio propagation path (radio fingerprinting) derivable features. In addition, the geo-location systems can also use collateral information, e.g., information other than that derived for the RF measurement to assist in the geo-location of the mobile appliance, for example, location of roads, dead-reckoning, topography, map matching, etc.

In a network-based geo-location system, the mobile appliance to be located is typically identified and radio channel assignments determined by (a) monitoring the control information transmitted on a radio channel or wireline interface that is part of the wireless communication system for telephone calls being placed by the mobile appliance to detect calls of interest, e.g., 911 calls, (b) a location request provided by a non-mobile appliance source, e.g., an enhanced services provider. Once a mobile appliance to be located has been identified and radio channel assignments determined, the location determining system is first tasked to determine the geo-location of the mobile appliance, and then directed to report the determined position to requesting entity or enhanced services provider.

The monitoring of the RF transmissions from the mobile appliance or wireline interfaces containing call setup or channel assignment information to identify calls of interest is known as "tipping", and generally involves recognizing a call of interest being made from a mobile appliance and collecting the call setup information. Once the mobile appliance is identified and the call setup information is collected, the location determining system can be tasked to geo-locate the mobile appliance.

Figure 1:
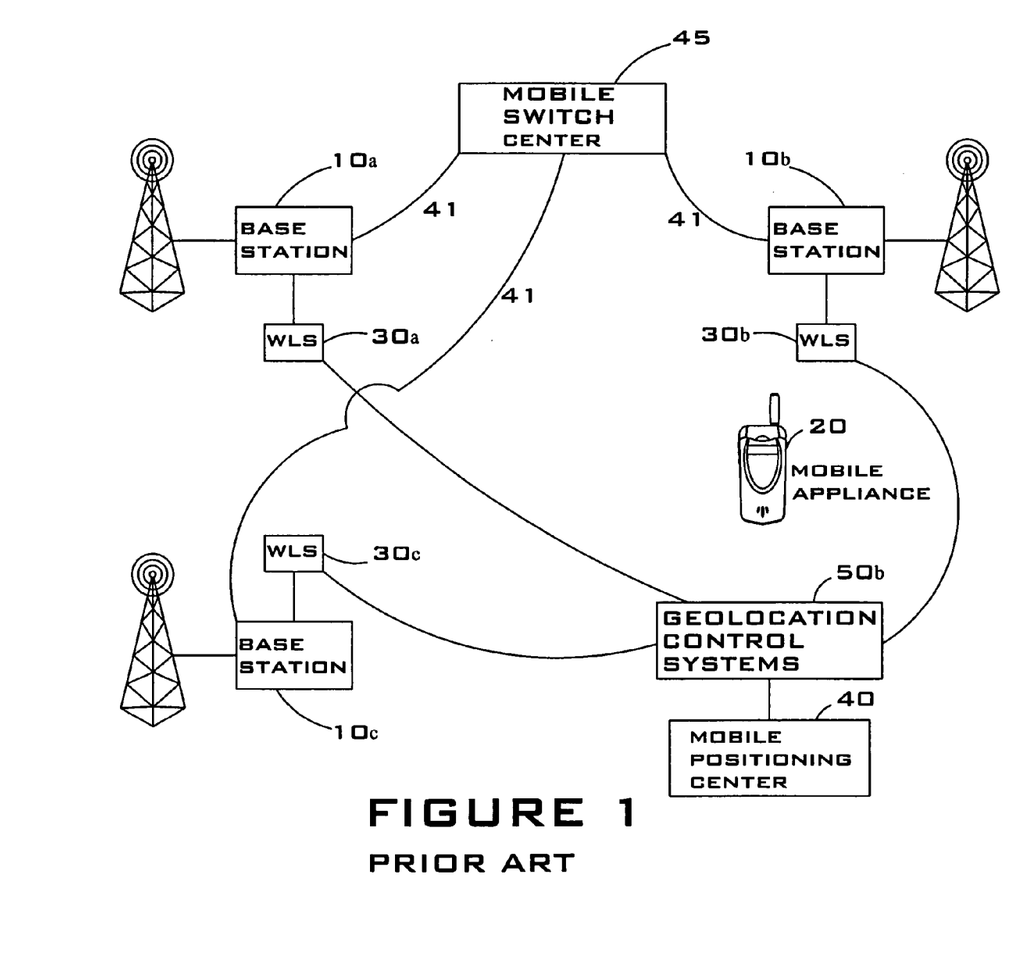
FIG. 1 is an illustration of a prior art wireless communication system with a network overlay geo-location system.

FIG. 1 shows a conventional mobile-appliance communication system having a mobile switching center 45 connected by wire lines 41 to base stations 10*a*–*c* for communicating with a mobile appliance 20. Each base station 10 generally comprises signal processing equipment and an antenna for transmitting to and receiving signals from the mobile appliance 20 as well as communicating with other base stations and one or more centrally located control and processing stations (not shown). A mobile appliance location determining sensor 30*a*–*c* (i.e., geo-location sensor, or wireless location sensor "WLS", etc.) may be positioned at some or all of the base stations 10 to determine the location of a mobile appliance 20 within the signal coverage area of the communication system.

A network overlay geo-location system is generally composed of two main components, one that resides at the base station that makes measurements on the RF signal emanating from the wireless device, the wireless location sensor (WLS) 30 and one that resides at the mobile switch that tasks the geo-location sensor groups to collect data and then uses the data to compute a location estimate, this latter component is generally referred to as the Geo-location Control System (GCS) 50 and is connected to the mobile positioning center MPC 40.

Figure 2:
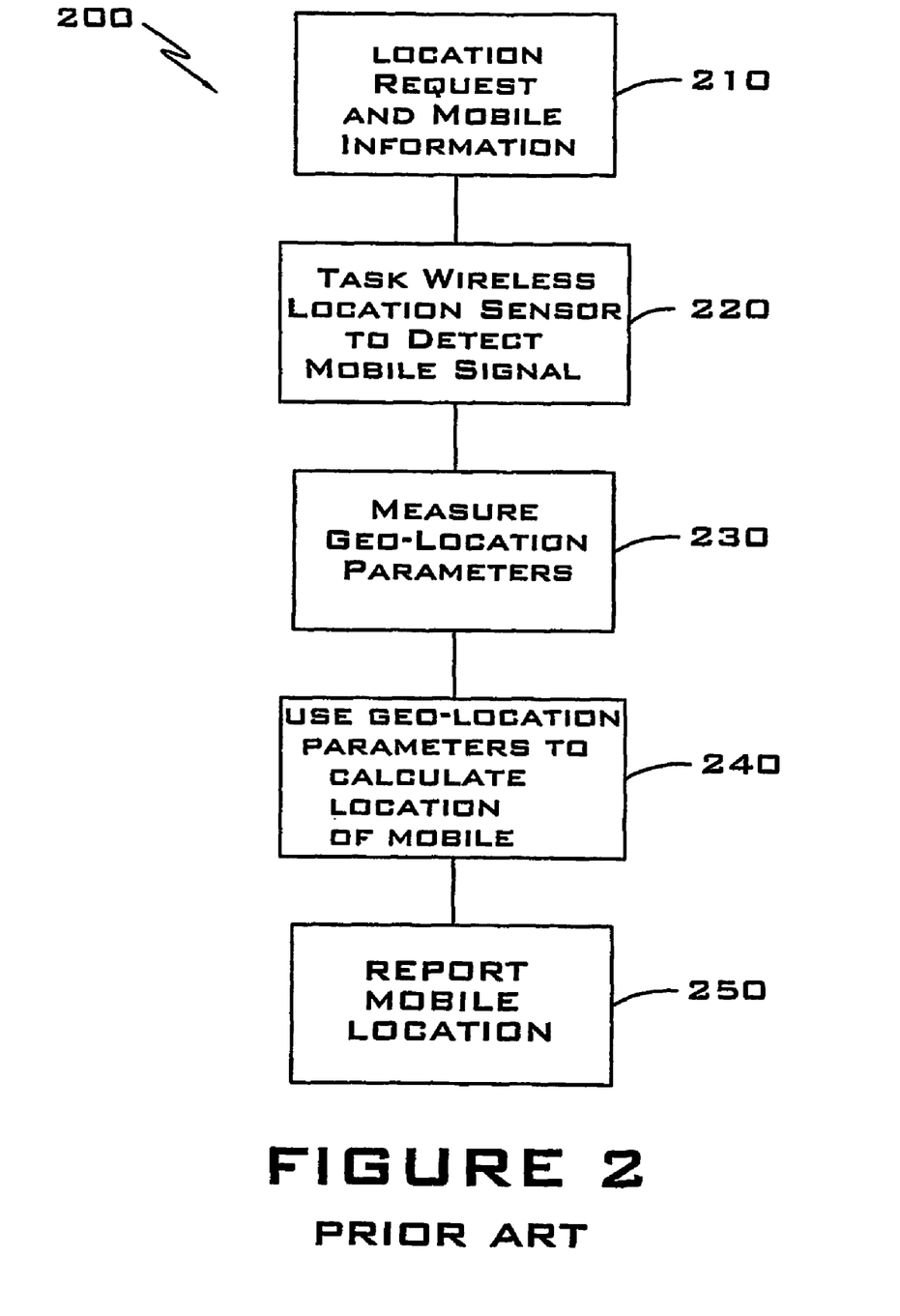
FIG. 2 is a flow chart illustration a prior art geo-location process.

FIG. 2 is a flow chart illustration a typical geo-location process 200. In the normal course of operation, the GCS may be tasked by an outside entity to generate a location estimate on a particular mobile appliance in block 210. The tasking typically is accompanied by information on the mobile of interest which may include the serving base station and sector for the call and the RF channel (frequency, time slot, CDMA code, etc.) being used by the wireless communications network to complete the wireless connection. Once the GCS receives this tasking, based on the serving sector, it tasks a set of WLS units proximate to the serving sector or serving base station to detect the signal from the target mobile appliance in block 220. The set of WLSs make measurement on the RF emission of the mobile appliance's signal, as indicated by block 230. The WLS units then report the measurements to the GCS. The GCS then computes a location estimate typically using some mathematical or data matching algorithm, as represented in block 240, and reports the estimated location to the requesting entity, as indicated in block 250. In an alternative embodiment, control channels/information on either RF or wireline links used to set up calls in the wireless network can be scanned to detect the placement of a call of interest. The signaling that occurs on the control channel can be used to determine location, or RF traffic channel parameters can be extracted from the control channel messaging to determine which traffic channel to use for location related measurements.

Network overly location systems typically locate a mobile appliance on the traffic channels of a wireless network. The systems typically use sensors employing techniques of time difference of Arrival (IDOA) supplemented with Angle of Arrival (AOA) in some cases to perform a multi-site location computation. The traffic channel information is provided through a separate process, with one option being a wire line interface (FIG. 1) providing MOBINFO (IS-41 Mobile Information) parameters passed by the Mobile Positioning Center 40 (MPC) (FIG. 1) as part of the GPOSREQ (J-STD-036 Geo-location Position Request) message Operators of commercial wireless communication networks, as do most network operators, need to determine the performance of their wireless networks to effect repairs, plan expansion and adjudicate customer complaints. The current state of the art for collection of this data is to perform drive testing with a specialized drive test unit comprised of a test mobile telephone, GPS receiver, and data storage capability such as a laptop computer. Calls are placed from the test mobile and data is collected from an interface port on the phone. The collected data is composed of information related to the operation of the phone in the wireless network and typically includes received and transmitted power levels, handover status, data transmission quality (e.g., bit error rates, frame error rates), etc., along with location and time stamping. The drive test process produces data on the operation of the test mobile only and signals received at the test mobile. Thus, the performance of the reverse link and its associated merit parameters are not captured. Additionally, a technician is required to perform the drive testing. The prior art method also introduces dedicated calling traffic to the network and results in an additional associated system load. Yet other prior art used data collected at the Mobile Switch for these purposes. This method is generally of poor value given the collected measurements cannot be referenced to a mobile phone actual location, and only to a serving sector (this is the granularity with which the mobile switch knows the location of a mobile).

Geo-location systems, like the one illustrated in FIGS. 1 and 2, when not being tasked to locate a mobile appliance for emergency or other location-based services, are effectively in an idle mode. The tasking duty cycle can vary depending on what uses are being made of the location data For E911 purposes, the effective utilization of the location network is low. With other location enabled value added services, the use may be higher, depending on the service. A service providing turn by turn instructions to a motorist would likely be higher than a service that provides road side assistance.

The disclosed subject matter utilizes this excess capacity of the location network to generate test and measurement data. An additional embodiment gathers test and measurement data on the actual E911 calls, or on any calls being located for other value added services.

Thus is it an object of the disclosed subject matter to obviate the deficiencies of the prior art and provide in a geo-location system the ability to collect test and measurement data normally associated with drive testing methodology automatically and with no manual labor component, without adding any dedicated calling traffic to the network. The disclosed method and apparatus also enables the ability to collect both forward and reverse link data for a given wireless connection with installation of equipment at reverse link sites only. Another benefit of the disclosed subject matter is the ability to operate a continuous background task for network overlay location which does not burden the network.

These objects and other advantages of the disclosed subject matter will be readily apparent to one skilled in the art to which the disclosure pertains from a perusal or the claims, the appended drawings, and the following detailed description of the preferred embodiments.

BRIEF DESCRIPTION OF THE DRAWINGS

Common elements are identified with similar reference number where advantageous.

DETAILED DESCRIPTION

Figure 3:
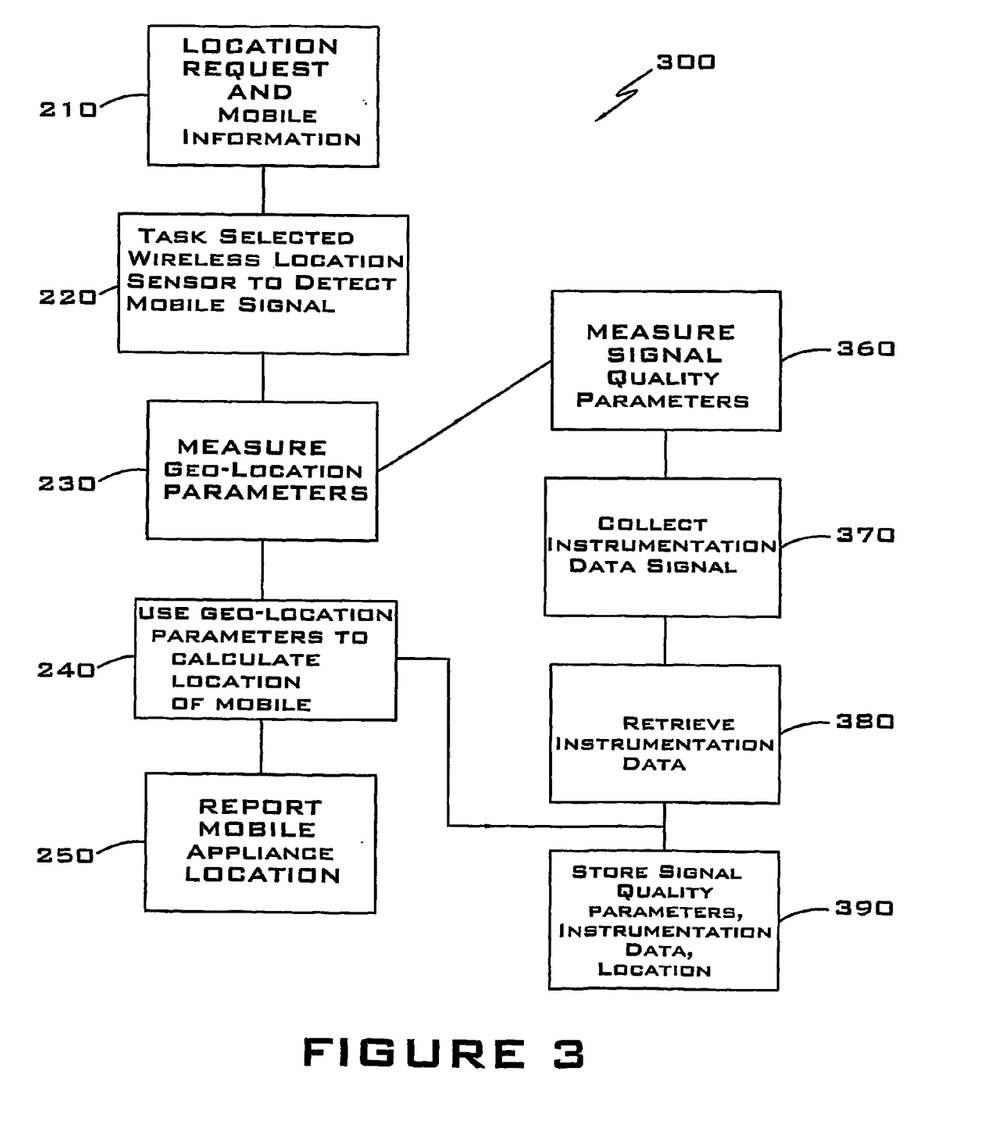
FIG. 3 is a flow chart illustrating a method for collecting test and measurement data during requested geo-location according to an embodiment of the disclosed subject matter.

FIG. 3 illustrates an embodiment of a disclosed method 300 for collecting system information while in the process of generating location estimates for mobile devices as requested from a mobile positioning center or other independent requestor. The information collected can then be fashioned to serve the needs of wireless network operators for test and measurement data.

In block 210 as discussed with relation to FIG. 2, the geo-location system receives a request to locate a target mobile appliance along with mobile information. In block 220, the GCS, based on available information about the target mobile, tasks selected geo-location sensors to detect the mobile appliance's signal using channel information included in the mobile information. The geo-location sensors selected are typically in the vicinity or proximate to the serving sector or base station. In block 230 the geo-location sensors measure geo-location parameters such as TOA, AOA or other signal parameters which assist in estimating the location of the target mobile appliance. The geo-location sensors may also measure and collect signal quality parameters, such as received signal strength (RSSI) and carrier to interference ratio (C/I) as represented in block 360.

One of the selected geo-location sensors (WLS), which may be in the serving sector for the target mobile appliance, is further tasked to capture a signal sample from the mobile appliance in block 370. The time duration for the signal sample is selected to be sufficient to capture instructional data which typically includes handoff assistance information measured by the mobile. This handoff assistance information is normally contained in MAHO (mobile assisted hand off) messages. The appropriate sample length may be determined from the frequency in which the instructional data is repeated in a transmission, which is specified for the air interface standard employed by the mobile appliance such as IS-136, GSM, CDMA, etc. The handoff assistance information typically includes received signal strength (RSSI) on the forward link from the serving base station as well as from one or more neighboring base stations. In prior art systems, this information was only available to system operators through a test drive with a technician operating a specially designed mobile as discussed previously.

The signal sample containing the instrumentation data can be demodulated and decoded by a designated primary geo-location sensor to extract the data as indicated by block 380, transmitted back to the GCS for extracting the information, or stored as a file for later processing.

The WLSs relay the geo-location parameters, the measured signal quality parameter and other collected data to the GCS. The GCS, using the geo-location parameters, calculates an estimated location for the target mobile, at block 240, and reports the mobile's location to the requesting entity, as indicated in block 250. Information such as the mobile's location, the signal quality parameters measured by the WLS, the instrumentation data or signal sample and time stamp, are then stored in a database, as shown in block 390. This stored information represents substantially simultaneous forward and reverse signal quality parameters. These linked parameters are not available though the prior art test drive method.

In the embodiment illustrated in FIG. 3, the system acquires test and measurement data only for those base stations or sectors involved in the location of the mobile based on an external request. While tasking requests may ultimately be uniform across the network, short or long term eccentricities in the data, or lack-there-of, are sure to occur, resulting in some areas of the network being over-laden with data while other areas only have sparse data. As discussed earlier, the disclosed subject matter makes use of the "downtime" or idle periods to direct data collection across the network, thus providing test and measurement data to those data starved areas of the network by focusing on specific sectors or network regions. This self directed data collection may also be used as the sole source of test and measurement data for the network. The embodiment shown in FIG. 4 represents self directed data collection process.

Figure 4:
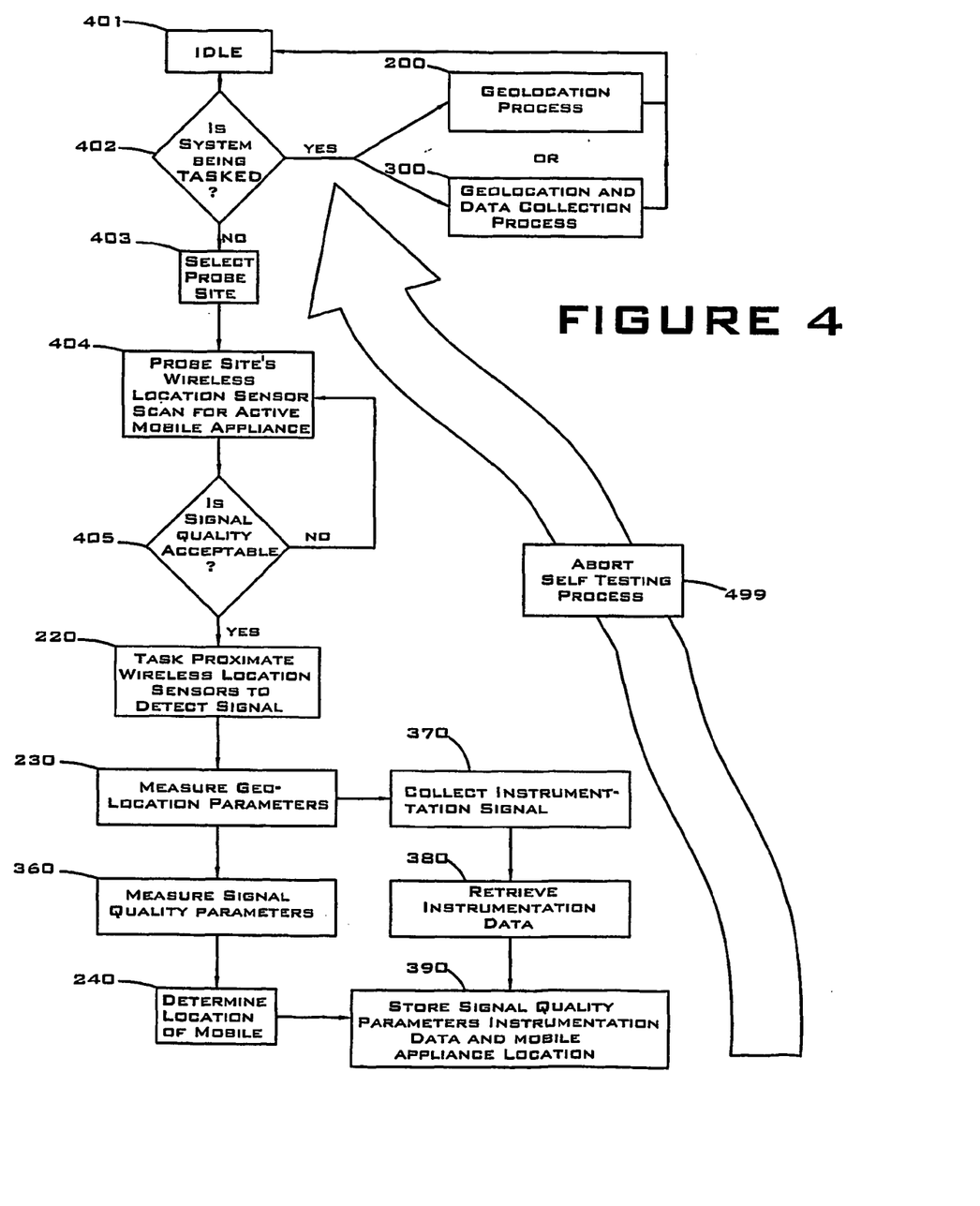
FIG. 4 is a flow chart illustrating a method for collecting test and measurement data in a self initiated manner according to an embodiment of the disclosed subject matter.

With reference now to FIG. 4, upon the geo-location system entering into an idle state, i.e., when the geo-location system is not attempting to geo-locate a mobile appliance in response to tasking from an external source, the geo-location system may begin a self-directed test and measurement data collection process. From the idle state 401, the geo-location system determines, at block 402, if there are any location requests for the system to process. If a location request is present, then the geo-location system comes out of the idle state and proceeds with either the geo-location process 200 as described with reference to FIG. 2 or with the geo-location piggy-backed with data collection process 300 as described with reference to FIG. 3. If the system is not being tasked with a location request, (i.e., the geo-location system is in an idle state) then the GCS selects a probe search site at block 403. It is to be understood by those of skill in the art that if the geo-location system receives a location request task at any point during the process shown in FIG. 4, the geo-location system stops generating test and measurement data until the location request is satisfied. Once the location request is satisfied, the geo-location system then resumes test and measurement data collection until another external task is received, as indicated by block 499. The probe search site selection by the GCS comprises designating a WLS (and generally one sector of a base station site being serviced by the WLS) as the probe search site. The probe site may be selected as part of a systematic schedule in which data is collected in a routine manner, moving across the network sequentially from one probe site to the next probe site. As appreciated by those of skill in the art, any method of data collection scheduling may be used and is contemplated by the present disclosure. As non-limiting examples, the schedule of data collection may be based on first designating those sectors with sparse measurement data, or the schedule may be a random walk through the network regardless of the amount of data known about a particular sector, or the schedule may be based on sectors or WLSs chosen at random, or any other scheduling method. The selection methodology can be pre-programmed, queued by an alarm or be established on the fly through a real time interface by an operator. Generally the selection methodology can cover entire market or targeted areas.

Continuing with the description of this embodiment of the disclosure, at block 404, the WLS at the probe site begins to scan in frequency/time slot/code to detect an active mobile operating within its sector to serve as a source for test and measurement data. The frequency/time slot/code information may be based on known operating parameters for the network or specific information from the GCS.

Once a mobile (the "probe mobile") is detected, the WLS determines the reception quality for the probe mobile's signal by testing, for example, received signal strength (RSSI), bit error rate (FER), frame error rate (PER), etc., at block 405. If the WLS determines that the probe mobile's signal is being received with sufficient quality, then the WLS informs the GCS that an acceptable mobile signal has been received. This determination may be based on a comparison of the signal quality parameters of the probe mobile to a threshold. As will be understood by those of skill in the art, the WLS may detect a probe mobile located in a sector other than a sector of interest, and if the probe mobile's signal quality exceeds the threshold, the likelihood of the probe mobile being located in the sector of interest is improved. If the probe mobile's signal quality is not acceptable, the WLS will continue to scan for another active mobile appliance.

The GCS operates on the information that a probe mobile signal has been received in a manner similar to the situation where the GCS receives information during external location request tasking, i.e., the GCS chooses a set of WLS units in the area that surrounds the probe search site (and/or the probe mobile) and requests that RF measurements be made as shown in block 220. However, since the GCS is in test data collection mode and not operating in response to a tasked request, the operator is free to experiment with different search and selection protocols, which adds additional flexibility to the test and measurement scheme. These may include increasing the number of tasked WLS units to collect more comprehensive test data at distant neighbor sites to the serving sector site.

The tasked WLS units make RF measurements on the probe mobile including, but not limited to, geo-location parameters, block 230, and signal quality parameters, block 360. The signal quality measurements may include, but are not limited to, received carrier to interference ration (C/I) and received signal strength (RSSI). These and other measurements are passed to the GCS is the same manner as if in a standard mobile location scenario.

Additionally, the primary site (the serving sector WLS) receives and stores a segment of RF transmission from the probe mobile, at block 370, and demodulates and decodes the segment to find any instrumentation data that may be present, at block 380. The length of the stored segment, as discussed previously, is chosen so that the desired data will likely be present.

The instrumentation data of interest typically includes handoff assistance information measured by the mobile and provided to the network to manage site to site handoffs. This data routinely comprises measurement data made by the mobile on neighbor cell sites (typically RSSI measurements on forward link transmissions from the neighbor cell sites). This data is forwarded to the GCS by the primary WLS. As referred to in the discussion of FIG. 3, an actual signal sample may also be relayed to the GCS where it is demodulated and decoded as needed or where processing functions are more readily available.

The GCS completes the normal location estimation process using measurements from participating WLS units in block 240. The GCS adds this test and measurement record to a database in block 390. The data in the record may include, but is not limited to, the location of the probe mobile, the time of the measurement, the C/I and RSSI data at the serving and neighboring cells for the reverse link, and the RSSI for neighboring cells for the forward link.

While the step elements shown in FIG. 4, as well as in FIG. 3, are shown as proceeding in series or parallel in relation to each other, the steps relating to measuring the RF signals, namely 230, 360 and 370 need not necessarily be carried out according to the relationship shown. The geo-location system constantly monitors for a location request and aborts the self directed data collection at any time a request is received and does not restart the self directed collection again until the location request has been satisfied as indicated by block 499.

Using the above-described test and measurement method, large amounts of test and measurement data for the network can be collected thereby generating a comprehensive, near simultaneous view of operation of the network for wireless carrier purposes. The selection of the probe search site can also be accomplished by any of a number of methods, and the designation of the desired neighbor sets can also be chosen by any of a number of different methods, including designating experimental neighbor sets. The probe search sites can be general and cover the entire network, or focused on specific areas of interest. The probe search sites may be chosen in accordance with an a priori plan or on the fly with a real time command interface. The neighbor lists for measurements can be generated based on the handoff neighbor list, or by a distance algorithm from the serving sector, or any other predetermined or user-interface on the fly method. The collected test and measurement data can be stored in a database, or simple file for batch review, or output on a real time interface to a test and measurement analysis tool, or any other application or display method known in the art. The data can also be formatted to match existing industry drive test tool formats so that existing testing and measurement analysis tools can be used.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

We claim:

1. In a wireless communication system having a plurality of base stations defining a signal coverage area for communicating with a mobile-appliance, and having a mobile-appliance location determining system overlay for determining the location of the mobile-appliance in the coverage area, a method of collecting test and measurement data, comprising the steps of:
    (a) selecting one of the plural base stations to search for a transmitting mobile-appliance;
    (b) at the selected one of the plural base stations, searching for a transmitting mobile-appliance by scanning frequency, time slot and code as a function of a set of operating parameters of the wireless communication system;
    (c) once a transmitting mobile appliance is detected, determining if the quality of the signal reception from the transmitting mobile appliance is acceptable;
    (d) selecting a set of the plural base stations in the vicinity of the transmitting mobile-appliance;
    (e) at ones of the plural base stations in the selected set, measuring the signal received from the transmitting mobile-appliance; and,
    (f) storing the measured signal data.

2. The method of claim 1 wherein the step of determining the signal quality is a function of at least one of a received signal strength, a bit error rate or a frame error rate.

3. The method of claim 1 wherein the step of measuring at one of the plural base stations in the selected set includes measuring the carrier to interference ratio and received signal strength.

4. The method of claim 1 wherein the step of measuring at one of the plural base stations in the selected set includes the steps of obtaining a signal sample from the transmitting mobile-appliance.

5. The method of claim 1, wherein the step of measuring at one of the plural base stations in the selected set includes the step of extracting information in the transmitting mobile-appliance's signal.

6. The method of claim 5 wherein the step of extracting information includes the steps of demodulating and decoding the transmitting mobile-appliance's signal.

7. The method of claim 5, wherein the information in the transmitting mobile-appliance's signal comprises handoff assistance data.

8. The method of claim 4, wherein the signal sample comprises handoff assistance data.

9. The method of claim 7 wherein the handoff assistance data comprises a received signal strength measured at the mobile appliance from at least one of the plural base stations in the selected set.

10. The method of claim 1, further comprising the step of aborting the collection of test and measurement data if the system is tasked to locate a mobile appliance.

11. In a method of collecting test and measurement data from a wireless communication system having a plurality of base stations defining a signal coverage area for communication with a mobile-appliance, wherein the base stations communicate with the mobile-appliance on a forward link transmission and the mobile appliance communicates with the base station on a reverse link transmission, the improvement comprising collecting forward and reverse data with equipment installed at the base stations only, and extracting the reverse data from the transmitting mobile-appliance's signal wherein the extracting comprises demodulating and decoding a portion of the transmitting mobile-appliance's signal.

12. The method of claim 11, wherein the reverse link data and the forward link data are collected substantially simultaneously.

13. The method of claim 11, wherein the forward link data includes received signal strength from one or more neighboring base stations.

14. The method of claim 11, wherein the step of collecting forward and reverse data is accomplished during a process of geo-locating the mobile appliance.

15. In a method of collecting test and measurement data in a wireless communication system having a plurality of base stations defining a signal coverage area for communicating with a mobile-appliance, the improvement wherein the test and measurement data is collected from transmissions between the mobile-appliance and the base stations during normal operation of the communication system and without adding any calling traffic to the network, and extracting reverse link data from a signal transmitted from the mobile-appliance wherein the extracting comprises demodulating and decoding a portion of the transmitting mobile-appliance's signal.

16. The method of claim 15, wherein the wireless communication system further comprises a geo-location system for locating a mobile appliance within the communication system and the test and measurement data is collected by the geo-location system.

17. In a method of collecting test and measurement data in a wireless communication system having a plurality of base stations defining a signal coverage area for communicating with a mobile-appliance, and having a mobile appliance location determining system overlay for determining the location of the mobile appliance in the coverage area, the improvement wherein the test and measurement data is collected by the location determining system wherein the location determining system collects the data during the process of locating the mobile appliance in response to a geolocation reguest, and wherein the location determining system aborts the collection of data when a geolocation reguest is received by the location determining system.

18. In a wireless communication system with a network overlay geo-location system for locating mobile appliances in communication with the wireless communication system, a method for system-initiated test and measurement data collection comprising the steps of:
selecting a probe area and tasking a probe geo-location sensor associated with the probe area to search for an active mobile appliance operating within the probe area;
selecting a probe mobile appliance from the probe area;
selecting other geo-location sensors proximate to the probe area to detect a signal from the probe mobile appliance;
measuring geo-location parameters and signal quality parameters of the probe mobile appliance signal at the probe geo-location sensor and at ones of the other geo-location sensors;
storing the measured signal quality parameters; and,
monitoring for receipt of a location request by the geo-location system and aborting the system-initiated test and measurement data collection after receipt of a location request by the geo-location system,
wherein the step of searching for an active mobile-appliance comprises the step of scanning frequency, time slot and code as a function of operating parameters of the wireless communication system.

19. The method of claim 18, wherein the geo-location parameters are selected from the group of TOA and AOA measurements.

20. The method of claim 18, wherein the signal quality parameters are selected from the group of carrier signal to interference ratio, received signal strength, bit error rate, frame error rate, and signal to noise ratio.

21. The method of claim 18, further comprising the step of extracting handoff assistance information from the probe mobile appliance.

22. The method of claim 21, wherein the step of extracting includes the step of demodulating and decoding a portion of the probe mobile appliance signal, said portion determined by frequency of handoff assistance information.

23. In a method of operating a geo-location system that geo-locates a mobile appliance in response to an external geo-location request where the mobile appliance is in communication with a wireless communication system including a network overlay geo-location system with plural base stations where each of the base stations serves at least one sector, the improvement comprising collecting test and measurement information with the geo-location system when the geo-location system is in an otherwise idle state wherein the collecting of test and measurement information is aborted when the geo-location system is no longer in the idle state and wherein the test and measurement information is collected on both forward and reverse communication links substantially simultaneously.

24. The method of claim 23 wherein the test and measurement information is collected on equipment installed only at ones of the plural base stations.

25. The method of claim 23 wherein the test and measurement information is collected from plural sectors according to a predetermined schedule.

26. The method of claim 23 wherein the test and measurement information includes obtaining signal quality parameters for a probe mobile appliance.

27. The method of claim 26 wherein the signal quality parameters are selected from the group of carrier signal to interference ratio, received signal strength, bit error rate, frame error rate, and signal to noise ratio.

28. The method of claim 16 further comprising the step of extracting handoff assistance information from the probe mobile appliance.

29. The method of claim 28 wherein the step of extracting includes the step of demodulating and decoding a portion of the signal from the probe mobile appliance wherein said portion is determined by frequency of handoff assistance information.

30. The method of claim 29 wherein the handoff assistance information includes received signal strength from ones of said plural base stations.

31. In a method of collecting test and measurement data in a wireless communication system having a plurality of base stations defining a signal coverage area for communicating with a mobile-appliance, and having a mobile appliance location determining system overlay for determining the location of the mobile appliance in the coverage area, the improvement wherein the test and measurement data is collected by the location determining system wherein the location determining system collects the data only when the location determining system is in an otherwise idle state and wherein the location determining system aborts the collection of data when a geolocation request is received by the location determining system.

32. In a method of operating a geo-location system that geo-locates a mobile appliance in response to an external geo-location request where the mobile appliance is in communication with a wireless communication system including a network overlay geo-location system with plural base stations where each of the base stations serves at least one sector, the improvement comprising collecting test and measurement information with the geo-location system when the geo-location system is in an otherwise idle state wherein the test and measurement information is collected without adding calling traffic to the wireless communication system and wherein the test and measurement information is collected on both forward and reverse communication links substantially simultaneously.

33. The method of claim 32 wherein the test and measurement information is collected on equipment installed only at ones of the plural base stations.

34. The method of claim 32 wherein the test and measurement information is collected from plural sectors according to a predetermined schedule.

35. The method of claim 32 wherein the test and measurement information includes obtaining signal quality parameters for a probe mobile appliance.

36. The method of claim 35 wherein the signal quality parameters are selected from the group of carrier signal to interference ratio, received signal strength, bit error rate, frame error rate, and signal to noise ratio.

37. The method of claim 35 further comprising the step of extracting handoff assistance information from the probe mobile appliance.

38. The method of claim 37 wherein the step of extracting includes the step of demodulating and decoding a portion of the signal from the probe mobile appliance wherein said portion is determined by frequency of handoff assistance information.

39. The method of claim 38 wherein the handoff assistance information includes received signal strength from ones of said plural base stations.

* * * * *